United States Patent
Yeh et al.

(10) Patent No.: US 10,717,063 B2
(45) Date of Patent: Jul. 21, 2020

(54) REACTOR SYSTEM FOR MULTI-PHASE POLYMERIZATION PROCESS

(71) Applicant: ExxonMobil Chemical Patents Inc., Baytown, TX (US)

(72) Inventors: Richard Cheng-Ming Yeh, Bellaire, TX (US); Richard D. Hembree, Houston, TX (US); Michael F. McDonald, Jr., Kingwood, TX (US); Joseph A. Maier, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 183 days.

(21) Appl. No.: 15/745,774

(22) PCT Filed: Jul. 8, 2016

(86) PCT No.: PCT/US2016/041462
§ 371 (c)(1),
(2) Date: Jan. 18, 2018

(87) PCT Pub. No.: WO2017/034685
PCT Pub. Date: Mar. 2, 2017

(65) Prior Publication Data
US 2018/0207608 A1 Jul. 26, 2018

Related U.S. Application Data

(60) Provisional application No. 62/209,587, filed on Aug. 25, 2015.

(51) Int. Cl.
*B01J 19/20* (2006.01)
*C08F 2/01* (2006.01)
(Continued)

(52) U.S. Cl.
CPC ............ *B01J 19/20* (2013.01); *B01J 19/1862* (2013.01); *C08F 2/01* (2013.01); *C08F 6/005* (2013.01)

(58) Field of Classification Search
USPC .................. 525/53; 528/502 C; 264/211.24; 366/89, 91; 425/203
See application file for complete search history.

(56) References Cited

U.S. PATENT DOCUMENTS 3,799,234 A * 3/1974 Skidmore ............... C08F 6/005
159/2.2
4,324,868 A 4/1982 Maeda
(Continued)

FOREIGN PATENT DOCUMENTS

| JP | 2011042094 A | 3/2011 |
|---|---|---|
| WO | 2012/058002 A | 5/2012 |

(Continued)

*Primary Examiner* — Fred M Teskin

(57) ABSTRACT

A polymer synthesis system has a polymerization reactor and a deliquifying-quench extruder downstream of and in fluid communication with the polymerization reactor. The polymerization reactor has an inlet and an outlet with a rotatable shaft positioned axially within the reactor. The deliquifying-quench extruder has an inlet and an outlet, with a shaft assembly positioned axially within the extruder. The shaft assembly includes multiple helical flight configurations and multiple processing zones defined by the multiple flight configurations. The processing zones include an extraction-compaction zone, a sealing zone downstream of the extraction-compaction zone, a vent-cooling zone downstream of the sealing zone, a quenching zone downstream of the vent-cooling zone, and a conveying zone downstream of the quenching zone.

20 Claims, 5 Drawing Sheets

(51) Int. Cl.
*C08F 6/00* (2006.01)
*B01J 19/18* (2006.01)

(56) References Cited

U.S. PATENT DOCUMENTS

| | | | |
|---|---|---|---|
| 5,651,944 A | | 7/1997 | Schulz et al. |
| 5,948,447 A | | 9/1999 | McHaney et al. |
| 5,980,790 A | * | 11/1999 | Kuwahara ............ C08F 220/14 |
| | | | 264/37.13 |
| 6,492,485 B1 | | 12/2002 | Gohr et al. |
| 2010/0234557 A1 | | 9/2010 | Sato et al. |
| 2010/0273973 A1 | | 10/2010 | Uchimura et al. |
| 2014/0031513 A1 | | 1/2014 | Namiki et al. |

FOREIGN PATENT DOCUMENTS

| | | |
|---|---|---|
| WO | 2014/033508 A | 3/2014 |
| WO | 2015/022079 A | 5/2015 |

\* cited by examiner

REACTOR SYSTEM FOR MULTI-PHASE POLYMERIZATION PROCESS

CROSS-REFERENCE TO RELATED APPLICATIONS

This application is a National Phase Application claiming priority to PCT Application Serial No. PCT/US2016/041462 filed Jul. 8, 2016, and claims the benefit of and priority to U.S. Provisional Application No. 62/209,587, filed Aug. 25, 2015, the disclosure of which are hereby incorporated by their references.

FIELD OF THE INVENTION

This disclosure relates to polymer synthesis systems that are useful for the polymerization and isolation of multi-phase polymerization compositions. In particular embodiments, the system includes a polymerization reactor and a deliquifying-quench extruder downstream of the polymerization reactor.

BACKGROUND OF THE INVENTION

In certain polymerization processes, liquid or gaseous monomer is polymerized in the presence of a diluent in which the polymerization product is not appreciably soluble. As a result, a slurry is formed in which the solid polymerization product is dispersed in the form of polymer particles or agglomerates. In many of these processes, the diluent facilitates heat transfer away from the polymer agglomerates.

While these processes are technologically useful, these polymerization processes present several challenges. To begin with, the resultant slurry may have a relatively high viscosity, which inhibits mixing and heat transfer, and which can negatively impact polymer properties, reactor operability, and may cause reactor fouling. This relatively high viscosity also places practical limitations on the solids content of the polymer being produced. Also, since the reaction takes place in the presence of a diluent, there is a need to separate the polymer and polymer agglomerates from the diluent and ultimately deliquify and dry the polymer product.

As the skilled person appreciates, polymerizations of this nature are typically conducted within continuously-stirred tank reactors using adequate volumes of diluent and mixing to maintain fluid conditions. Following polymerization, the diluent, which is often an organic solvent, is removed by conventional solvent stripping techniques. For example, the solvent may be stripped from the polymerization product by using steam desolventization techniques, which produces a wet product that must be dried.

These conventional processes, as well as the equipment used in these processes, can be energy intensive and costly. There is, therefore, a need for systems in which slurry polymerizations can be efficiently conducted.

SUMMARY OF THE INVENTION

Described herein are systems that can be used in synthesis and isolation of multi-phase polymeric compositions. These systems, which may also be referred to as reactor systems, include a reactor wherein a polymerization mixture (also referred to as a reaction mixture), which may include reactants, products, and optional diluents, are mixed, back mixed, and/or kneaded, and an extruder downstream of the reactor wherein physically-distinct constituents (e.g., phase-separated constituents) of the reaction mixture can be separated.

One aspect of the invention is directed toward a polymer synthesis system comprising: a polymerization reactor having an inlet proximate to a first end and an outlet proximate to an opposed second end, said reactor including a rotatable shaft positioned axially within said reactor and including at least two shearing paddles extending radially outward from said rotatable shaft; and a deliquifying-quench extruder having an inlet proximate to a first end and an outlet proximate to an opposed second end, said extruder including a shaft assembly positioned axially within said extruder and including multiple helical flight configurations, said extruder including multiple processing zones defined by the multiple flight configurations, said processing zones including an extraction-compaction zone, a sealing zone downstream of the extraction-compaction zone, a vent-cooling zone downstream of the sealing zone, a quenching zone downstream of the vent-cooling zone, and a conveying zone downstream of the quenching zone, where the deliquifying-quench extruder is downstream of said polymerization reactor, and where said deliquifying-quench extruder is in fluid communication with said polymerization reactor via the outlet of the reactor and the inlet of the extruder.

Other aspects of the invention are directed toward a polymer synthesis system comprising: a first vessel adapted to knead and/or granulate the contents thereof; and a second vessel adapted to process the contents thereof by sequentially (i) compacting the contents thereof while allowing for the bidirectional flow of physically-distinct constituents; (ii) subjecting the contents thereof to reduced pressures and/or increased temperatures to thereby volatilize lower-boiling constituents within the second vessel and separate them from the other constituents; (iii) mixing the contents thereof while introducing a quenching agent; (iv) conveying the contents thereof out of the second vessel, where the first vessel is in fluid communication with the second vessel, and where the second vessel is downstream of the first vessel.

Other aspects of the invention are directed toward a process for the production of polymer, the process comprising the steps of: charging monomer, catalyst and diluent to a polymerization reactor; polymerizing the monomer in the presence of catalyst to form a polymer product within the polymerization reactor while subjecting the monomer, polymer product, and diluent to kneading and/or granulating to thereby form a polymerization mixture; transferring the polymerization mixture from the polymerization reactor to a deliquifying-quench extruder; processing the polymerization mixture within the deliquifying-quench extruder by subjecting the polymerization mixture, or a portion thereof, to a sequential series of steps including (a) compacting the polymerization mixture to force diluent entrained within the polymer product to separate from the polymer product while permitting bidirectional flow whereby the polymer product is conveyed in one direction while the diluent is allowed to flow in an opposite direction, (b) subjecting the polymer product to reduced pressures to thereby volatilize at least a portion of any diluent or monomer entrained within the polymer product, (c) introducing a quenching agent to the polymer product while subjecting the polymer product to shear and mixing, (d) conveying the polymer product out of the deliquifying-quench extruder.

These and other features, aspects, and advantages of the present disclosure will become better understood with regard to the following description and appended claims.

DETAILED DESCRIPTION OF ILLUSTRATIVE EMBODIMENTS

Various specific embodiments, versions and examples will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways.

Figure 1:
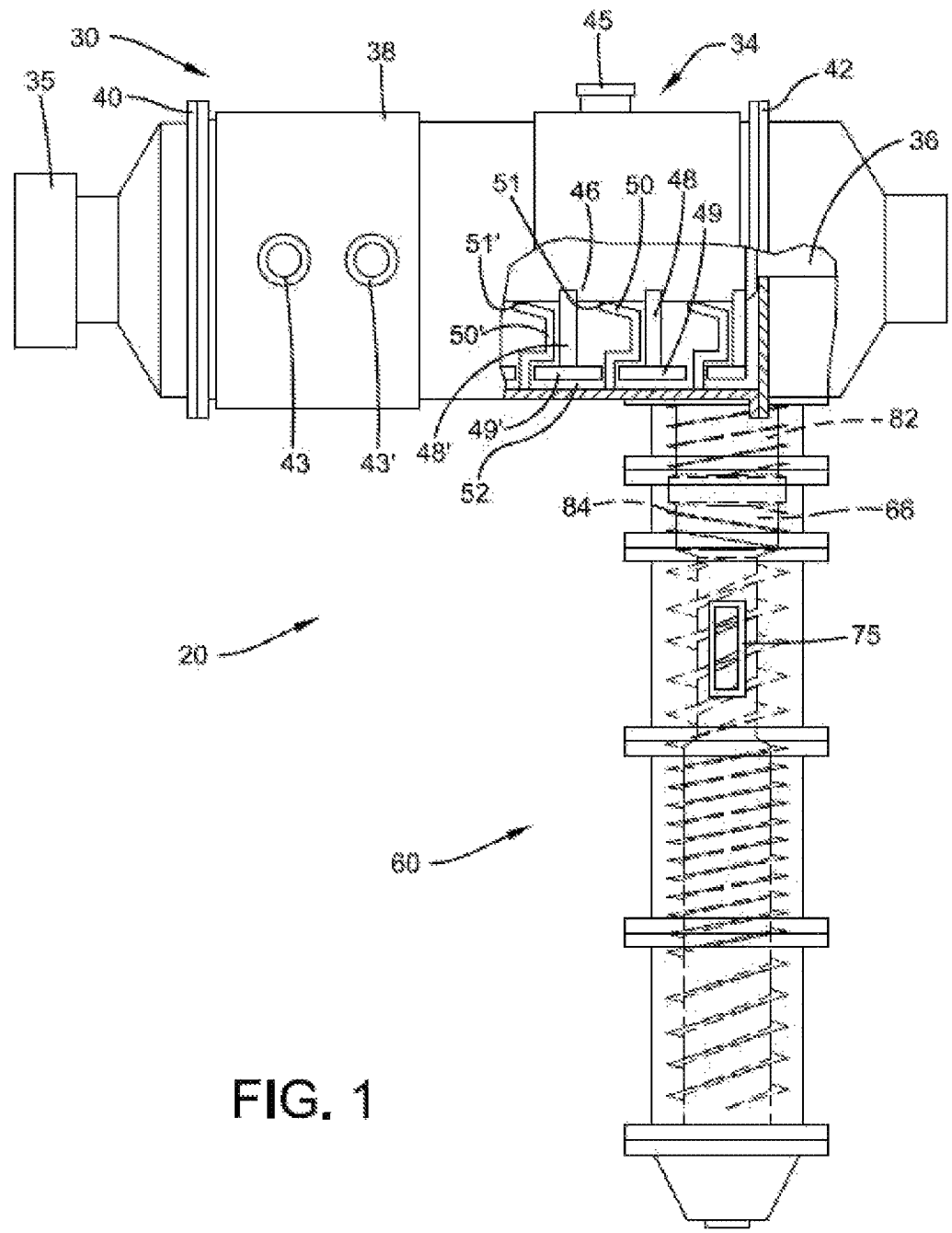
FIG. 1 is an overhead perspective view of a polymer synthesis system according to embodiments of the invention.
Figure 3:
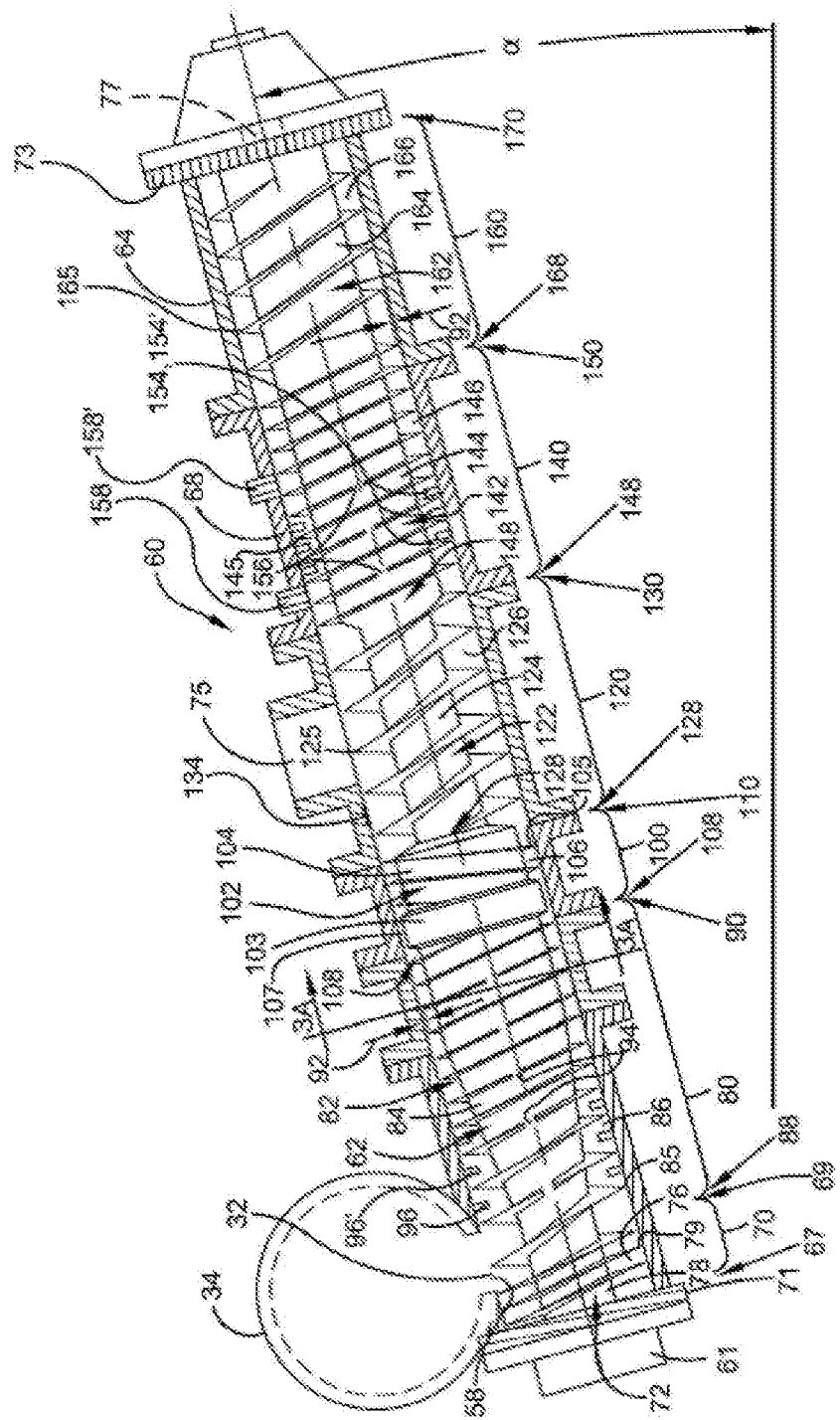
FIG. 3 is a side cut-away perspective view of a deliquifying-quench extruder according to embodiments of the invention.

Embodiments of the present invention can be described with reference to FIG. 1, which shows polymer synthesis system 20, which may also be referred to as reactor system 20 or simply system 20, including polymerization reactor 30, which may be referred to as reactor 30, and a deliquifying-quench extruder 60, which may be referred to as extruder 60, downstream of polymerization reactor 30. Reactor 30 is in fluid communication with extruder 60 via an outlet opening 32 of reactor 30 and an inlet opening 58 of extruder 60. As best shown in FIG. 3, outlet opening 32 may be directly mated to inlet opening 58. In other embodiments not shown, outlet opening 32 may be connected to inlet opening 58 through appropriate conduit. As a result of this configuration, materials within reactor 30 can be transferred to extruder 60 for further processing. Moreover, this configuration, which is described in greater detail below, allows for the bidirectional flow of materials between reactor 30 and extruder 60. In other words, while extruder 60 is downstream of reactor 30, and the configuration of both reactor 30 and extruder 60 promote downstream conveyance of materials, extruder 60 is adapted to allow for bidirectional flow (which will be described in greater detail below), and as a result, certain constituents flow upstream and can flow from extruder 60 out of inlet 58 into reactor 30 into outlet 32. In one or more embodiments, outlet 32 and inlet 58 are configured to maximize the opening between reactor 30 and extruder 60 to thereby facilitate bidirectional flow between reactor 30 and extruder 60.

In one or more embodiments, both reactor 30 and extruder 60 are generally positioned horizontally with respect to their axes but within separate planes. Namely, reactor 30 is positioned above extruder 60, which allows gravity to assist in the movement of materials from reactor 30 to extruder 60 via openings 32, 58. In one or more embodiments, as shown in FIG. 3, extruder 60 is offset relative to the axis of reactor 30. Stated another way, and as shown in FIG. 3, extruder 60 may be positioned at an angle α relative to the horizontal such that its axis is lower at a front wall 71 than its end wall 73. This angle (i.e., α) may be from 0° to about 90°, in other embodiments from about 5° to about 60°, or in other embodiments from about 7° to about 45°. As a result of this positioning, materials within at least a portion of extruder 60, especially less viscous materials such as liquids, can, through the assistance of gravity, flow toward front wall 71 and out of extruder 60 via opening 58 and back into reactor 30. Additionally, as shown in FIG. 3, where extruder 60 is positioned at an angle relative to reactor 30, opening 32 of reactor 30 is offset relative to the vertical axis of reactor 30. As a result of this configuration, the transfer of materials from reactor 30 to extruder 60 will not necessarily favor the denser constituents, which would occur if outlet 32 were positioned at the bottom of 30. By positioning opening 32 closer to the horizontal axis of reactor 30, a more even distribution of constituents transferred from reactor 30 to extruder 60 can be achieved.

Figure 2:
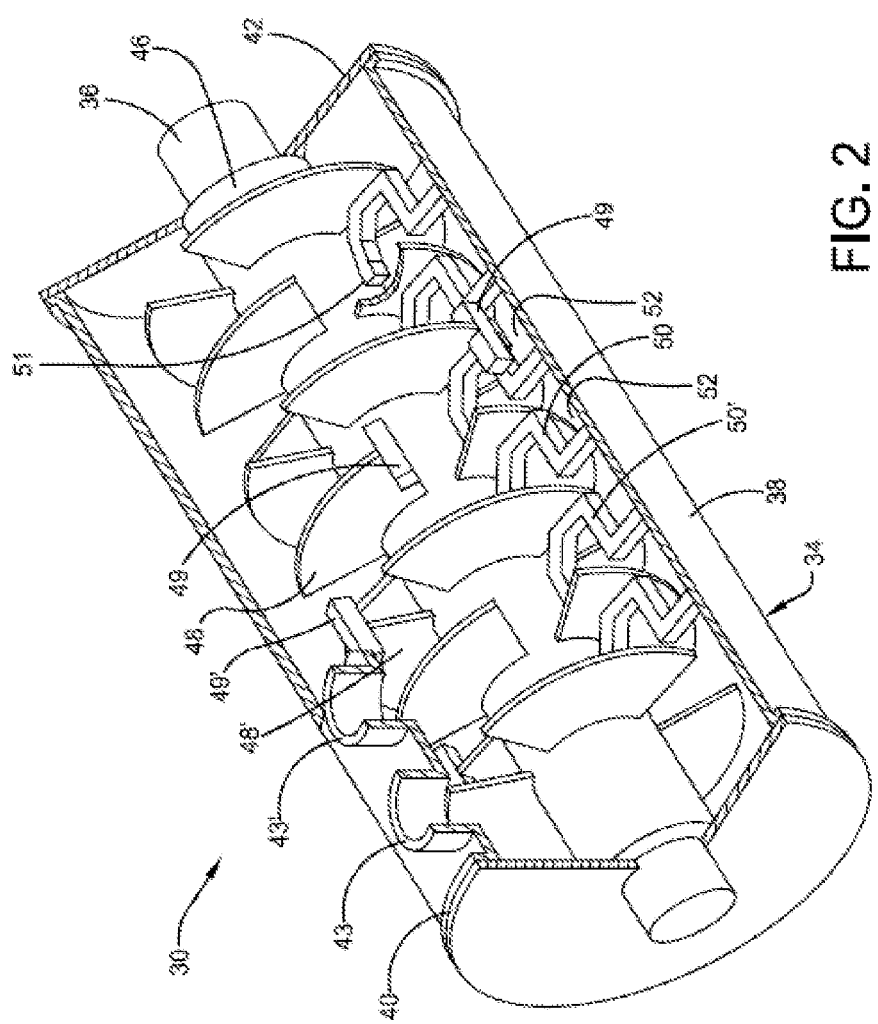
FIG. 2 is a cut-away perspective view of a reactor according to embodiments of the invention.

In one or more embodiments, reactor 30 is adapted to mix, back mix, knead and/or granulate the contents of the reactor. As the skilled person appreciates, many factors can influence the manner in which the materials being processed within reactor 30 are impacted. For example, the material characteristics could influence whether the material is kneaded or granulated. Likewise, where multiple phases are being processed the relative amounts of, for example, liquid and solid could influence the ultimate impact on the materials. In one or more embodiments, reactor 30 provides adequate volume within the interior of the reactor to allow for adequate head space while providing mechanical mixing elements that create relatively high surface contact between the contents of the reactor and the mixing elements within the reactor. In one or more embodiments, as shown in FIG. 2, reactor 30 generally includes housing 34 (which may also be referred to as barrel 34) and a shaft assembly 36 positioned axially within housing 34. In one or more embodiments, shaft assembly 36 is rotatable and may be suitably supported for rotation by the use of bearings, which are not shown. Shaft assembly 36 may be mechanically attached to a suitable drive source 35 (shown in FIG. 1) for rotating shaft assembly 36 at a desired speed. In one or more embodiments, shaft assembly 36 is mechanically attached to a single drive source as shown in FIG. 1, and in other embodiments not shown, shaft assembly 36 may be mechanically attached to two distinct drive sources at opposing ends of shaft 36.

Housing 34 includes side wall 38, first end wall 40 and second end wall 42. The skilled person will appreciate that housing 34 includes inner and outer surfaces, where the inner surfaces define the reaction zone or space within reactor 30, and the outer surfaces define the exterior of reactor 30. For purposes of this description, the inner surfaces bear most significantly on practice of the invention, and therefore reference to housing 34 and/or side wall 38, end wall 40, and end wall 42 will, unless otherwise stated, refer to the configuration or characteristics of the inner surface of housing 34.

Side wall 38 and/or end walls 40, 42 may include one or more openings. For example, as shown in FIG. 1, inlets 43, 43' are provided in side wall 38 radial to shaft assembly 36. Likewise, side wall 38, first end wall 40, and/or second end wall 42 may include one or more outlets. For example, and as shown in FIG. 1, outlet 45 is provided within side wall 38 radial to shaft assembly 36. In particular embodiments, outlet 45 is adapted to allow removal of a vapor stream (also referred to as gaseous stream) from the reactor, which can thereby provide for the evaporative cooling of the materials within the reactor. As will be appreciated by the skilled person, the location of the inlets and outlets can be varied based upon preference. For example, it may be desirable to include an inlet or outlet (not shown) within first end wall 40. Furthermore, inasmuch as reactor 30 is a sealed vessel, which refers to a vessel that can be operated under increased pressures or under vacuum, any opening within reactor 30 is adapted with a positive isolation device such as mechanical seals or valves.

In one or more embodiments, side wall 38 is generally cylindrical and therefore the cross-section area (i.e., the area transverse to shaft assembly 36) is constant or substantially constant through the axial length of reactor 30. The axial length of reactor 30 extends from a first end wall 40 to a second end wall 42, which is longitudinally opposed to first end wall 40.

As suggested above, reactor 30 is adapted to mix, knead and/or granulate the contents thereof. Several designs can accomplish these goals. Kneading and/or granulating provides both large surface contact with the kneading elements and surface renewal of the materials within the reactor (e.g., agglomerates that may form are mechanically broken or chopped to expose the inner surface of the agglomerates). The skilled person understands that this can be accomplished through low-shear mixing in combination with sufficient mixing volume. Also, reactor 30 is adapted to convey the materials within the reactor; namely, reactor 30 is adapted to convey materials toward outlet 32. The skilled person understands that this can be accomplished through, for example, a shaft assembly including a plurality of mixing elements that are helically wrapped around the core and thereby provide a conveying force to materials within reaction zone 30. In one or more embodiments, these elements can also provide the desired shearing surface area for the desired amount of shear energy to be inputted to the materials within reaction zone 30.

In particular embodiments, the desired mixing, kneading and/or granulating within reactor 30 is accomplished through a hook and paddle kneading arrangement. For example, reactor 30 may include two or more kneading paddles. As best shown in FIG. 2, shaft assembly 36 may include axial portion 46 and one or more flights of paddles 48, 48' extending radially from axial portion 46. In one or more embodiments, shaft assembly 36 may include 3 to 10 flights of paddles, or in other embodiments 4 to 8 flights. A "flight" of paddles is defined as a grouping or series of paddles along a common line or angle extending longitudinally down axial portion 46. The number of flights is dependent on a variety of factors including the diameter of the side wall, the diameter of the axial portion, and the width of each paddle. In one or more embodiments, each flight of paddles may contain at least 2 and up to 20 paddles. The number of paddles may be dependent on a variety of factors including the axial length of the first portion, the diameter of the axial portion, the diameter of the side wall, and the amount of shear energy desired to be generated in the first portion. Reference may also be made to a radial grouping of paddles, which refers to those paddles sharing a common position along the length of axial portion 46. In other words, a radial grouping of paddles shares a common plane that is transverse to the axis of axial portion 46. In one or more embodiments, the number of paddles within a radial grouping is equal to the number of flights.

In one or more embodiments, each flight of paddles may extend at an angle along the longitudinal length of axial portion 46. Depending on the length of axial portion 46, this angular arrangement may cause the flight of paddles to generate a helical pattern about axial portion 46. For example, where the length of reactor 30 is sufficiently long, each flight might fully wrap itself at least once about axial portion 46. Due to the angle, when the kneader is viewed from each end, a portion of each successive paddle in each flight is visible, as generally shown in FIG. 2.

In one or more embodiments, each paddle 48, 48' has a truncated triangular shape as best shown in FIG. 2. The width of each paddle 48, 48' can be measured transverse to the axis of axial portion 46. As shown in FIG. 2, the width of each paddle 48, 48' increase as the paddles extend radially away from axial portion 46. One or more of paddles 48, 48' may carry clearing bars 49, 49'. As shown in FIG. 2, clearing bars 49, 49' may be substantially thinner than the width of each paddle 48, 48' or in other embodiments the width of bars 49, 49' may extend over a larger portion of paddles 48, 48' (i.e., extend over a greater portion of the radial arc of the paddle). Also, as best shown in FIG. 2, bars 49, 49' extend perpendicularly from the radial axis of paddles 48, 48' and are oriented parallel to axial portion 46. In alternative embodiments, which are not shown, bars 49, 49' may be positioned at an angle with respect to axial portion 46, which will provide a conveying affect to materials within reactor 30. For example, bars 49, 49' may be offset at an angle of 0° to 30° relative to axial portion 46.

In one or more embodiments, paddles 48, 48' are configured and arranged to operate in conjunction with at least two hooks 50, 50' that are fixed to side wall 38. In one or more embodiments, as shaft assembly 46 rotates, paddles 48, 48' past adjacent hooks 50, 50', respectively. Hooks 50, 50' are also arranged in flights along the axial length of reactor 30. The number flights of hooks may depend on a variety of factors including the number of paddles 48, 48' in each flight of paddles. Hooks 50, 50' may also be described with reference to radial groupings of hooks, which refers to the number of hooks that share a common location along the length of reactor 30. In one or more embodiments, reactor 30 may include at least one hook per radial grouping. The number of hooks within a radial grouping may depend on a number of factors including the axial length of the first portion, the diameter of the axial portion, the diameter of the side wall, and the amount of shear energy desired to be generated in the first portion. The number of radial groupings may likewise depend on a number of factors. In one or more embodiments, reactor 30 includes one radial grouping of hooks (or simply one hook) per radial grouping of paddles.

In one or more embodiments, each hook 50, 50' has a radially inner terminal end 51, 51' that does not contact axial portion 46 of shaft assembly 36. Hooks 50, 50' are configured to obtain a desired surface area for shearing of reactant and product within reactor 30 to thereby obtain desired surface area for shearing and provide a combination of radial and horizontal shearing surfaces. As best shown in FIG. 1, a space 52, which may also be referred to as channel 52, exists between shaft assembly 36 (i.e., axial portion 46 and paddles 48, 48'), and the inner diameter of side wall 38, as well as hooks 50, 50'.

As indicated above, reactor 30 is adapted to, among other things, convey materials toward outlet 32. In one or more embodiments, reactor 30 is adapted to create pulsatile flow (i.e., flow with periodic variations) of the materials being processed within reactor 30, especially as the materials near outlet 32. As a result, materials within reactor 30 exit via outlet 32 in a pulsating manner. In one more embodiments, reactor 30 provides for pulsatile flow through the arrangement of paddles (e.g., paddles 48, 48') and/or the positioning of the paddles and/or deflector plates relative to outlet 32. In one or more embodiments, those paddles proximate outlet 32 are adapted to include or are replaced with paddles or elements designed to intermittently squeeze or compress the materials within reactor 30 against the inner wall of reactor 30 while undergoing rotation, which thereby forces material out of outlet 32 while the element passes across outlet 32. Useful elements of this nature are described in WO 93/21241, which is incorporated by reference herein. Also, in order to facilitate the pulsatile flow and also advantageously reduce shear at or near outlet 32, reactor 30 may be devoid of hooks (e.g., hooks 50, 50') at or near outlet 32.

In one or more embodiments, reactor 30 may be equipped with one or more temperature control devices (not shown). For example, reactor 30 may be equipped with a heating or cooling jacket to control the temperature of the materials being processed within reactor 30. Likewise, reactor 30 may be equipped with one or more pressure control devices (not shown). For example, reactor 30 may be equipped with a pressure control device (e.g., vacuum device) to control pressures within reactor 30. As the skilled person will appreciate, by controlling the pressure and/or temperature within reactor 30, cooling of the contents within the reactor can be accomplished by employing evaporative cooling techniques.

While the exemplary embodiments have been described with reference to a single-shaft, hook and paddle kneader device, the skilled person understand that similar devices having multiple shafts can likewise be used to accomplish the desired mixing, kneading, and/or granulating.

Turning now to deliquifying-quench extruder 60, reference can be made to FIG. 3, which shows extruder 60 including housing 64 (also referred to as barrel 64) and shaft assembly 62.

Housing 64 includes side wall 68, first end wall 71 and second end wall 73. The skilled person will appreciate that housing 64 includes inner and outer surfaces, where the inner surfaces define the processing zone or space within extruder 60, and the outer surfaces define the exterior of extruder 60. For purposes of this description, the inner surfaces bear most significantly on practice of the invention, and therefore reference to housing 64 and/or side wall 68, end wall 71, and end wall 73 will, unless otherwise stated, refer to the configuration or characteristics of the inner surface of housing 64.

Side wall 68, first end wall 71, and second end wall 73 may include one or more openings. For example, an outlet opening 77 is provided within second end wall 73. As noted above, extruder 60 includes inlet opening 58 within housing 64. Additional inlets, not shown, may also be provided in side wall 68. Likewise, side wall 68, first end wall 71, and/or second end wall 73 may include one or more outlets. For example, outlet 75 is provided within side wall 68. In particular embodiments, outlet 75 is adapted to allow for the removal of a gaseous stream from extruder 60, which gaseous stream can be initiated through, for example, a vacuuming of at least a portion of extruder 60, which will be discussed in greater detail below. As will be appreciated by the skilled person, the location of the inlets and outlets can be varied based upon preference. For example, it may be desirable to include an inlet or outlet (not shown) within first end wall 71. Furthermore, inasmuch as extruder 60 is a sealed vessel, which refers to a vessel that can be operated under increased pressures or under vacuum, any opening within extruder 60 may be adapted with a positive isolation device, such as a mechanical seals or valves. In particular embodiments, outlet 77 is adapted with a positive isolation device (e.g., a full-port ball valve).

In one or more embodiments, side wall 68 is generally cylindrical and therefore the cross-section area (i.e., the area transverse to shaft assembly 62) is constant or substantially constant through the axial length of extruder 60. The axial length of extruder 60 extends from first end wall 71 to a second end wall 73, which is longitudinally opposed to first end wall 40.

Figure 3A:
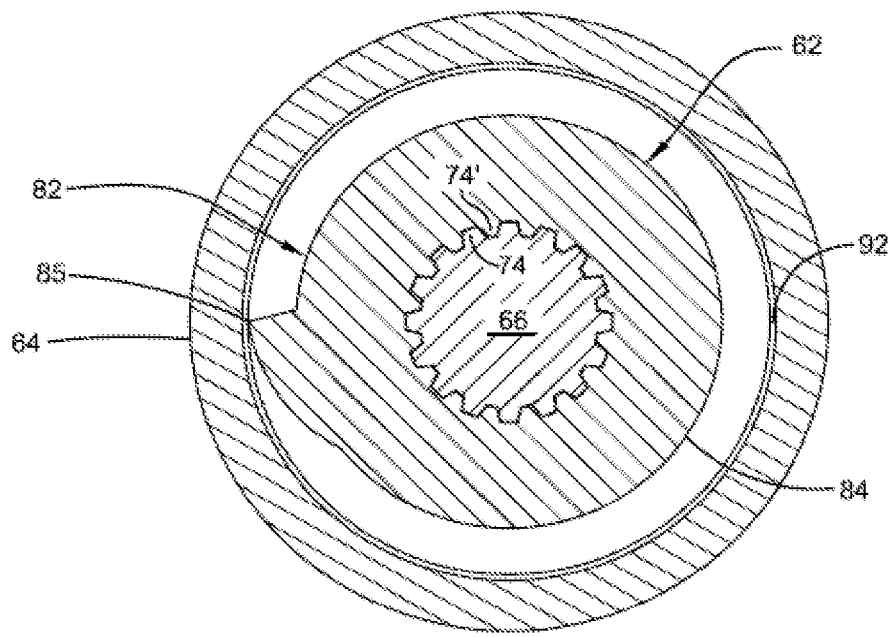
FIG. 3A is a cross-sectional view taken along 3A of FIG. 3.

As best shown in FIG. 3A, shaft assembly 62 includes an axial portion 66, which may be referred to as a core shaft 66, and a screw element(s) (e.g., 82 as will be described below) that is carried by and driven by core shaft 66. As shown in FIG. 3A, screw element 82 (as well as other screw elements along the length of shaft 66) may be slideably engaged through engaging elements such as gear teeth 74 located on core shaft 66 and gear teeth 74' located on screw element 82.

In one or more embodiments, as shown in FIG. 3, core shaft 66, and therefore shaft assembly 62, is rotatable and may be suitably supported for rotation by the use of bearings, which are not shown. Core shaft 66 may be mechanically attached to a suitable drive source 61 for rotating shaft assembly 62 at a desired speed. In one or more embodiments, core shaft 66 is mechanically attached to a single drive source as shown in FIG. 3, and in other embodiments not shown, core shaft 66 may be mechanically attached to two distinct drive sources at opposing ends of core shaft 66.

As the skilled person will appreciate, core shaft 66 extends through an opening within first wall 71 to engage a support system (e.g., bearing system) and/or drive source 61 as shown in FIG. 3. Similarly, core shaft 66 may extend through an opening within second wall 73 to engage a support system (e.g., bearing system) and/or a drive source. In order to prevent leakage of liquid material from extruder 60, especially at the upstream end adjacent to first wall 71, extruder 60 can be equipped with an appropriate liquid seal system at the interface between core shaft 66 and wall 71 (and optionally wall 73) where core shaft 66 extends therethrough.

The subcomponents of shaft assembly 62 within extruder 60, particularly the various screw elements disposed along core shaft 66, may be further described with reference to operationally distinct portions of extruder 60. Specifically, extruder 60 may be defined with references to first portion 70, which may also be referred to as sealing zone 70, second portion 80, which may also be referred to as extraction-compaction zone 80, third portion 100, which may also be referred to as sealing zone 100, fourth portion 120, which may also be referred to as vent-cooling zone 120, fifth portion 140, which may also be referred to as quenching zone 140, and sixth portion 160, which may also be referred to as conveying zone 160. In one or more embodiments, each of the foregoing portions (a.k.a. zones) is arranged sequentially in the order provided above.

In one or more embodiments, extruder 60 may be equipped with one or more temperature control devices (not shown). For example, extruder 60 may be equipped with a heating or cooling jacket to control the temperature of the materials being processed within extruder 60. Likewise, extruder 60 may be equipped with one or more pressure control devices (not shown). For example, extruder 60 may be equipped with a pressure control device (e.g., vacuum device) to control pressures within extruder 60. As the skilled person will appreciate, by controlling the pressure and/or temperature within extruder 60, cooling of the contents within the reactor can be accomplished by employing evaporative cooling techniques. Since extruder 60 includes multiple zones characterized by, among other things, unique shaft attributes as explained herein, the pressure and temperature control systems can be segmented to accommodate for desired segmentation of temperature and pressure control along the axis of extruder 60.

While each portion of extruder 60 is adapted to convey the contents of the extruder with a positive overall net flow forward (especially with regard to solid materials being processed with the extruder), each portion is uniquely adapted to impart intended forces on the contents therein to thereby accomplish distinct goals. For example, first portion 70 is adapted to convey materials away from first wall 71 and therefore away from sealing devices associated with the interface between core shaft 66 and first wall 71. Second portion 80 is adapted to separate physically-distinct constituents within the contents of the extruder (e.g., separate liquids and solids) and allow one of the constituents to migrate or flow (as in the case of a liquid) back toward inlet 58. Third portion 100 is adapted to restrict flow of material within extruder 60 and fill any voids within third portion 100 to thereby create a seal between second portion 80 and the other downstream portions such as fourth portion 120 and fifth portion 140. Fourth portion 120 is adapted to provide a low pressure zone, which low pressure can positively prevent backward flow of materials, especially materials within the subsequent fifth portion 140, from flowing backward across third portion 100, while also allowing for evaporative cooling of materials within fourth portion 120. Fifth portion 140 is adapted to vigorously mix the materials within extruder 60 and thereby disperse additives, such as quenching agents, introduced within extruder 60 at fifth portion 140. Sixth portion 160 is adapted to transfer material within extruder 60 to outlet 77.

As indicated above, first portion 70 is adapted to aggressively convey materials away from first wall 71, which advantageously minimizes fouling and contamination of any liquid seal system at the interface of shaft assembly 62 and wall 71.

In one or more embodiments, the conveying action within first portion 70 is provided by the configuration of the screw element(s) within first portion 70. As shown in FIG. 3, shaft assembly 62 within first portion 70 includes a screw element 72 that includes a helical element having one or more flights, where the flight includes a flight base 78 and flight tip(s) 79. A space 76, which may be referred to as a channel 76, exists within the interstices of screw element 72. Channel 76 can be characterized based upon the cross-sectional area at any point along the axis of shaft assembly 62, which cross-sectional area is generally in the form of an interrupted annulus. As the skilled person will appreciate, the cross-sectional area is a function of the channel depth, which is the difference between the root diameter (which is defined by the diameter of flight base 78) and the crest diameter, which may also be referred to as the flight diameter (which is defined by the diameter of flight tips 79). Channel 76 can also be characterized based upon the width of the respective channels (also referred to as flight pitch), which is the distance between the respective flight tips 79. Screw element 72 may also be characterized by the screw helix angle along the axis of shaft assembly 62.

First portion 70 includes first end 67 that is proximate to and defined by first wall 71 and second end 69 that is proximate to second portion 80 and defined by the interface between first portion 70 and second portion 80. First end 67 may also be referred to as front end 67 or upstream end 67, and second end 69 may be referred to as terminal end 69 or downstream end 69.

Generally, the skilled person will appreciate that the conveying requirements of first portion 70 can be met with conventional designs with relatively high flight pitch that can serve to generate enough pressure to force the materials within first portion 70 away from first end 67 toward second end 69 of first portion 70.

Turning now to second portion 80, reference is made again to the fact that second portion 80 is adapted to separate physically-distinct constituents within the contents of extruder 60 and allow one of the constituents to migrate or flow (as in the case of a liquid) back to first wall 71 toward inlet 58. Accordingly, second portion 80 is adapted to provide bidirectional flow of materials. As the skilled person recognizes, physically-distinct constituents within the context of this invention, refers to those materials that can be separated by squeezing and compacting actions taking place within second portion 80 and/or the combination of conveying action working against gravitational forces. For example, solids can be separated from liquids within second portion 80. Likewise, viscous liquids can be separated from less viscous liquids within second portion 80.

In one or more embodiments, this separation and bidirectional flow is provided by the configuration of the screw element(s) within second portion 80. As shown in FIG. 3, shaft assembly 62 within first portion 70 includes a screw element 82 that includes a helical element having one or more flights, where the flight includes a flight base 84 and flight tip(s) 85. A space 86, which may be referred to as a channel 86, exists within the interstices of screw element 82. Channel 86 can be characterized based upon the cross-sectional area at any point along the axis of shaft assembly 62 within second portion 80, which cross-sectional area is generally in the form of an interrupted annulus. As the skilled person will appreciate, the cross-sectional annular area is a function of the channel depth, which is the difference between the root diameter (which is defined by the diameter of flight base 84) and the crest diameter, which may also be referred to as the flight diameter (which is defined by the diameter of flight tips 85). Channel 86 can also be characterized by the width of the respective channels (also referred to as flight pitch), which is the distance between the respective screw tips 85. Screw element 82 may also be characterized by the screw helix angle along the axis of shaft assembly 62 within second portion 80.

Second portion 80 includes first end 88 that is proximate to first portion 70 and defined by the interface between first portion 70 and second portion 80, and second end 90 that is proximate to third portion 100 and defined by the interface between second portion 80 and third portion 100. First end 88 may also be referred to as front end 88 or upstream end 88, and second end 90 may also be referred to as terminal end 90 or downstream end 90.

As generally shown in FIG. 3, the channel depth of channel 86 decreases from first end 88 to second end 90 within second portion 80. In one or more embodiments, the rate of channel depth decrease is smooth and continuous. In these or other embodiments, the rate of decrease may be defined in terms of the ratio of the cross-sectional annular area at first end 88 to the cross-sectional annular area at second end 90. For example, the rate of decrease may be represented by a ratio of cross-sectional area at first end 88 to the cross-sectional area at second end 90 of from 1.2:1 to 5:1.

As also generally shown in FIG. 3, the channel pitch decreases from first end 88 to second end 90 within second portion 80. In one or more embodiments, the rate of channel pitch decrease may be smooth and continuous, or in other embodiments it may be stepped. In these or other embodiments, the rate of decrease may be defined in terms of the ratio of the channel pitch at first end 88 to the channel pitch at second end 90. For example, the rate of decrease may be represented by a ratio of channel pitch at first end 88 to the channel pitch at second end 90 of from 1.2:1 to 5:1.

Helical flight 84 is oriented to create positive flow from first end 88 to second end 90 of solid materials being processed within second portion 80. At the same time, shaft assembly 62, within second portion 80, is configured to allow a reverse flow (i.e., a flow in a direction form second end 90 to first end 88) of less viscous (e.g., liquid) materials within second portion 80. This reverse flow of less viscous materials is initiated by the channel depth differential (discussed above), which can be attributed to a differential in the root diameter of screw element 82, and also optionally by the positioning of extruder 60 at an angle where the axis of extruder 60 (represented by the axis of shaft assembly 62) is higher at second wall 72 than first wall 70, which angled positioning is described above. In any event, configuration of screw assembly permits this backflow.

In one or more embodiments, the height of each respective screw flight(s) 85, which is defined as the distance from base 84 to the respective flight tip(s) 85 is less than the distance from base 84 to the inner wall of side wall 68. In other words, and also shown in FIG. 3A, a space 92, which may also be referred to as a gap 92 or flight clearance 92, exists between flight tip(s) 85 and side wall 68 (inner surface) within second portion 80. As a result of this configuration, less viscous materials (e.g., liquids) can flow upstream toward first end 88 and toward opening 58 while the direction of screw element 82 carries the more viscous materials (e.g., solid) toward second end 90.

Still further, the respective flights of screw element 82 may include various openings 94, which may also be referred to as slots 94. As with gap 92, slots 94 allow less viscous materials (e.g., liquids) to flow upstream toward first end 88 (and toward opening 58) while the direction of screw element 82 carries the more viscous materials (e.g., solid) toward second end 90. In one or more embodiments, side wall 68 includes one or more breaker pins 96, 96', which are radial protrusions extending from side wall 68 toward core shaft 66, that intermesh with slots 94. As the skilled person will appreciate, pins 96, 96' can serve to prevent slippage of materials being processed within reactor 60.

Thus, as a result of the decrease in channel depth and flight pitch through second portion 80, materials being processed within second portion 80 undergo increased pressure resulting in the squeezing and compaction of the materials as the materials are moved from first end 88 to second end 90 by operation (i.e., rotation) of screw element 82. Where the materials are multi-phased materials, the less viscous materials (e.g., the liquid materials) are separated from the more viscous materials (e.g., the solids) through this compaction (e.g., liquid entrained within solids are squeezed out of the solid), while the solids are conveyed forward (i.e., downstream) by screw element 82. At the same time, the increased diameter of core shaft 72, optionally in conjunction with the angle at which extruder 80 is positioned, and the gaps 92 and/or slots 94, allow the liquids to flow upstream toward first end 88 and inlet opening 58.

Turning now to third portion 100, reference is made again to the fact that third portion 100 is adapted to restrict flow of material within extruder 60 and fill any voids within third portion 100 to thereby create a seal between second portion 80 and the other downstream portions of extruder 60 such as fourth portion 120 and fifth portion 140.

In one or more embodiments, this filling of voids (i.e., filling of the channel space) within third portion 100 is provided by the configuration of shaft assembly 62 within third portion 100. As shown in FIG. 3, shaft assembly 62 includes a screw element 102 that includes a helical element having one or more flights, where the flight includes a flight base 104 and flight tip(s) 105.

A space 106, which may be referred to as a channel 106, exists within the interstices of screw element 102 within third portion 100. Channel 106 can be characterized based upon the cross-sectional area at any point along the axis of shaft assembly 62, which cross-sectional area is generally in the form of an interrupted annulus. As the skilled person will appreciate, the cross-sectional annular area is a function of the channel depth, which is the difference between the root diameter (which is defined by the diameter of flight base 104) and the crest diameter, which may also be referred to as the flight diameter (which is defined by the diameter of flight tip(s) 105). Channel 106 can also be characterized by the width of the respective channels (also referred to as flight pitch), which is the distance between the respective flight tips 105. Screw element 102 may also be characterized by the screw helix angle along the axis of shaft assembly 62.

In one or more embodiments, shaft assembly 62 also includes a dam 103 positioned within third portion 100. As the skilled person will appreciate, this dam may include a separate annular element secured to core shaft 66.

An annular space 107, which may also be referred to as a dam channel 107, exists between the outer diameter of dam element 103 and side wall 68. Dam channel 107 can be characterized by its depth, which is the distance between the outer diameter of dam element 103 and inner wall of side wall 68. In one or more embodiments, the depth of dam channel 107 is tailored to the properties (e.g., viscosity) of the materials being processed within extruder 60 and desired pressure upstream of dam channel 107. As will be explained in greater detail below, the desired pressure upstream of dam channel 107 is selected to provide an adequate pressure differential versus the fourth portion 120 so as to prevent any fluid backflow. As the skilled person will appreciate, by creating a relatively narrow or small dam channel 107, materials being conveyed into third portion 100 from second portion 80 will be tightly compacted within dam channel 107 and thereby form a seal that separates materials within second portion 80 from materials within downstream portions such as fourth portion 120.

Third portion 100 includes first end 108 that is proximate to second portion 80 and defined by the interface between second portion 80 and third portion 100, and second end 110 that is proximate to fourth portion 120 and defined by the interface between third portion 100 and fourth portion 120. First end 108 may also be referred to as upstream end 108, and second end 110 may also be referred to as downstream end 110.

In one or more embodiments, in order to assist in the forcing of materials into dam channel 107, which will assist in the sealing function described above, screw element 104, which is positioned downstream of dam 103, is reversed. That is, the helical orientation of screw element 102, when rotated by core shaft 66, generally causes materials being processed within third portion 100 to be forced backwards (i.e., from downstream end 110 to upstream end 108), which forces materials into dam channel 107. The skilled person will appreciate that the degree of force imparted upstream by the reversing of screw element 102 (which force can be manipulated by, for example, flight pitch and helical angle) impacts pressure build-up upstream of dam channel 107, which can thereby cause an increase in the temperature of materials being processed. The skilled person can therefore, without undue calculation or experimentation, select appropriate characteristics for screw element 102 to achieve a desired balance of pressure differential and temperature increase in the materials being processed.

Thus, as a result of the relatively narrow depth of dam channel 107, the positive flow of material (in a downstream direction) from second portion 80, and the generally backward forces caused by reversed flights 104, material within extruder 60 is subjected to forces within third portion 100 that cause an accumulation of material within dam channel 107, which accumulation of material serves to seal, and thereby isolate, second portion 80 from fourth portion 120.

Turning now to fourth portion 120, reference is made again to the fact that fourth portion 120 is adapted to provide a low pressure zone, which low pressure can positively prevent or inhibit backward flow of materials, especially materials within the subsequent fifth portion 140, from flowing upstream across third portion 100 (e.g., across dam channel 107). Also, reference is made again to the fact that fourth portion 120 is adapted to provide evaporative cooling of materials within fourth portion 120. In conjunction with the evaporative cooling, fourth portion 120 is adapted to disengage materials having a lower vapor pressure from those materials having a higher vapor pressure.

In one or more embodiments, the disengaging forces imparted within fourth portion 120 are provided by the configuration of the screw element(s) within fourth portion 120. As shown in FIG. 3, shaft assembly 62 within fourth portion 120 includes a screw element 122 that includes a helical element having one or more flights, where the flight includes a flight base 124 and flight tip(s) 125. A space 126, which may be referred to as a channel 126, exists within the interstices of screw element 122. Channel 126 can be characterized based upon the cross-sectional area at any point along the axis of shaft assembly 62, which cross-sectional area is generally in the form of an interrupted annulus. As the skilled person will appreciate, the cross-sectional annular area is a function of the channel depth, which is the difference between the root diameter (which is defined by the diameter of the flight base 124) and the crest diameter, which is the distance between the respective tip(s) 125). Channel 126 can also be characterized based upon the width of the respective channels (also referred to as flight pitch), which is the distance between the respective flight tips 125. Screw element 122 may also be characterized by the screw helix angle along the axis of shaft assembly 62.

Fourth portion 120 includes first end 128 that is proximate to third portion 100 and defined by the interface between third portion 100 and fourth portion 120, and second end 130 that is proximate to fifth portion 140 and defined by the interface between fourth portion 120 and fifth portion 140. First end 128 may also be referred to as upstream end 128, and second end 130 may also be referred to as downstream end 130. As generally shown in FIG. 3, the diameter of flight base 124 is relatively constant from first end 128 to second end 130.

As generally shown in FIG. 3, the depth of channel 126 is relatively large, which depth is dictated by the diameter of flight base 124, compared to the depth of the channels within the portions of extruder 60 adjacent to fourth portion 120; i.e., upstream and downstream of fourth portion 120, which includes the channel depth of channel 106 of third portion 100 and the channel depth of channel 146 of fifth portion 140 (which will be described in greater detail below). Likewise, in one or more embodiments, the flight pitch of screw element 122 within fourth portion 120 is relatively large compared to the flight pitch of the screw elements within the portions of extruder 60 adjacent to fourth portion 120; i.e., upstream and downstream of fourth portion 120, which includes the flight pitch of screw element 102 of third portion 100 and the flight pitch of screw element 142 of fifth portion 140.

As the skilled person will appreciate, at a given shaft speed, the channel depth and flight pitch determine the conveying capacity within any given zone or portion of extruder 60. The channel depth and flight pitch within fourth portion 120, especially with respect to the adjacent portions (e.g., third portion 100 and fifth portion 140), provide a relatively high conveying capacity, which ensure that this portion of extruder 60 can operate partially filled and thereby maintain a head space. Stated another way, fourth portion 120 is designed to push or convey material at a faster rate than material is fed to fourth portion 120. As a result of this, materials having a lower vapor pressure can be disengaged from those materials having a higher vapor pressure through the assistance of the head space.

As suggested above, fourth portion 120 may include an opening, e.g., opening 75, which allows for the removal volatile materials from fourth portion 120, such as those volatile materials disengaged from the less volatile materials as described above. In one or more embodiments, the removal of volatile materials may be facilitated by pulling a vacuum within fourth portion 120. Inasmuch as the upstream zones or portions of extruder 60 (e.g., third portion 120) operate at relatively high pressures, fourth portion 120 can operate at atmospheric, or even under applied positive pressure, while still providing for the evaporative cooling and removal of volatiles.

As suggested above, extruder 60 may be equipped with one or more temperature control devices, which devices may be particularly useful at fourth portion 120. For example, extruder 60 may include a heating or cooling jacket 134 at fourth portion 120 to control the temperature of the materials being processed within fourth portion 120. As the skilled person will appreciate, by controlling the pressure and/or temperature within fourth portion 120, separation of materials with differing volatilization points can be accomplished.

Thus, as a result of the high conveying capacity within fourth portion 120 relative to the adjacent upstream portions, fourth portion 120 provides for the creation of a head space within extruder 60, which head space facilitates the disengagement of more volatile materials from less volatile materials. This feature can be combined with the control of temperature and/or pressure to create an environment where these more volatile materials can be separated and removed from the extruder. As a result, further separation of distinct materials can be accomplished within fourth portion 120. Still further, the differential in conveying capacity helps ensure that materials within downstream zones, e.g., portion 140, do not migrate upstream to upstream zones, e.g., third portion 100.

Turning now to fifth portion 140, reference is made again to the fact that fifth portion 140 is adapted to vigorously mix the materials within extruder 60 and thereby allow for the rapid dispersion of additives, such as quenching agents, that can be introduced within extruder 60 at fifth portion 140.

In one or more embodiments, the ability to vigorously mix materials within fifth portion 140 is provided by the configuration of shaft assembly 62 within fifth portion 140. As shown in FIG. 3, shaft assembly 62 within fifth portion 140 includes screw element 142 that includes a helical element having one or more flights, where the flight includes a flight base 144 and flight tip(s) 145. A space 146, which may be referred to as a channel 146, exists within the interstices of screw element 142. Channel 146 can be characterized based upon the cross-sectional area at any point along the axis of shaft assembly 62, which cross-sectional area is generally in the form of an interrupted annulus. As the skilled person will appreciate, the cross-sectional annular area is a function of the channel depth, which is the difference between the root diameter (which is defined by the diameter of flight base 144) and the crest diameter, which may also be referred to as the flight diameter (which is defined by the diameter of flight tips 145). Channel 146 can also be characterized based upon the width of the respective channels (also referred to as flight pitch), which is the distance between the respective flight tips 145. Screw element 142 may also be characterized by the helix angle along the axis of shaft assembly 62.

In one or more embodiments, vigorous mixing is provided by the shallow depth of channel 146, as well as the relatively low flight pitch, which the skilled person appreciates will provide for relatively slow velocity of material in positive, downstream direction, thereby increasing the mixing time within fourth zone 140.

Further, in one or more embodiments, mixing can be intensified by breaker pins 154, 154', which are radial protrusions extending from side wall 68 toward core shaft 66. The skilled person appreciates that these breaker pins 154 can operate in conjunction with slots 156, which are openings in screw element 142 that intermesh with breaker pins 154. In one or more embodiments, breaker pins 154 are adapted to serve as one or more inlet for additives, such as quenching agents, to be injected into extruder 60 at fifth portion 140. As the skilled person will appreciate, breaker pins can be adapted with a hollow center tube, which allows for the injection of materials into extruder 60. Alternatively or in combination with the breaker pins, additives can be introduced into fifth portion 140 through one or more inlets, such as inlet 158, 158'.

While the desired vigorous mixing within fifth portion 140 can be accomplished as set forth above (i.e., shallow channel depth and shallow flight pitch), the skilled person can use multiple alternative configurations to achieve the desired high shear mixing. For example, the skilled person can used commercially-known screw designs including those referred to as porcupine screw segments, pineapple screw segments, Maddock screw mixers, and kneading block screws.

Fifth portion 140 includes first end 148 that is proximate to fourth portion 120 and defined by the interface between fourth portion 120 and fifth portion 140, and second end 150 that is proximate to sixth portion 160 and defined by the interface between fifth portion 140 and sixth portion 160. First end 148 may also be referred to as upstream end 148, and second end 150 may also be referred to as downstream end 150. As generally shown in FIG. 3, the diameter of flight base 144 is relatively constant from first end 148 to second end 150.

As suggested above, the intense mixing within fifth portion 140 allows for rapid and intimate mixing of additive materials with the materials being processed within extruder 60, while maintaining adequate conveying in a downstream direction.

Turning now to sixth portion 160, reference is made again to the fact that sixth portion 160 is adapted to convey materials being processed within extruder 60 out of extruder, which as indicated above can take place through outlet 77 within end wall 73. In one or more embodiments, the ability to convey materials, as well as the characteristics of the conveying, such as velocity and mixing, is provided by the configuration of shaft assembly 62 within sixth portion 160.

As shown in FIG. 3, shaft assembly 62 within sixth portion 160 includes a screw element 162 that includes a helical element having one or more flights, where the flight includes a flight base 164 and flight tip(s) 165. A space 166, which may be referred to as a channel 166, exists within the interstices of screw element 162. Channel 166 can be characterized based upon the cross-sectional area at any point along the axis of shaft assembly 62, which cross-sectional area is generally in the form of an interrupted annulus. As the skilled person will appreciate, the cross-sectional annular area is a function of the channel depth, which is the difference between the root diameter (which is defined by the diameter of flight base 164) and the crest diameter, which may also be referred to as the flight diameter (which is defined by the diameter of flight tips 165). Channel 166 can also be characterized based upon the width of the respective channels (also referred to as flight pitch), which is the distance between the respective flight tips 165. Screw element 162 may also be characterized by the screw helix angle along the axis of shaft assembly 62.

Generally, the skilled person will appreciate that the conveying requirements of this section can be met with conventional designs with relatively high flight pitch that can serve to generate enough pressure to force the materials within extruder 60 out of outlet 77.

Sixth portion 160 includes first end 168 that is proximate to fifth portion 140 and defined by the interface between fifth portion 140 and sixth portion 160, and second end 170 that is proximate to and defined by end wall 73. First end 168 may also be referred to as upstream end 168, and second end 170 may also be referred to as downstream end 170. As generally shown in FIG. 3, the diameter of flight base 164 is relatively constant from first end 168 to second end 170.

Figure 4:
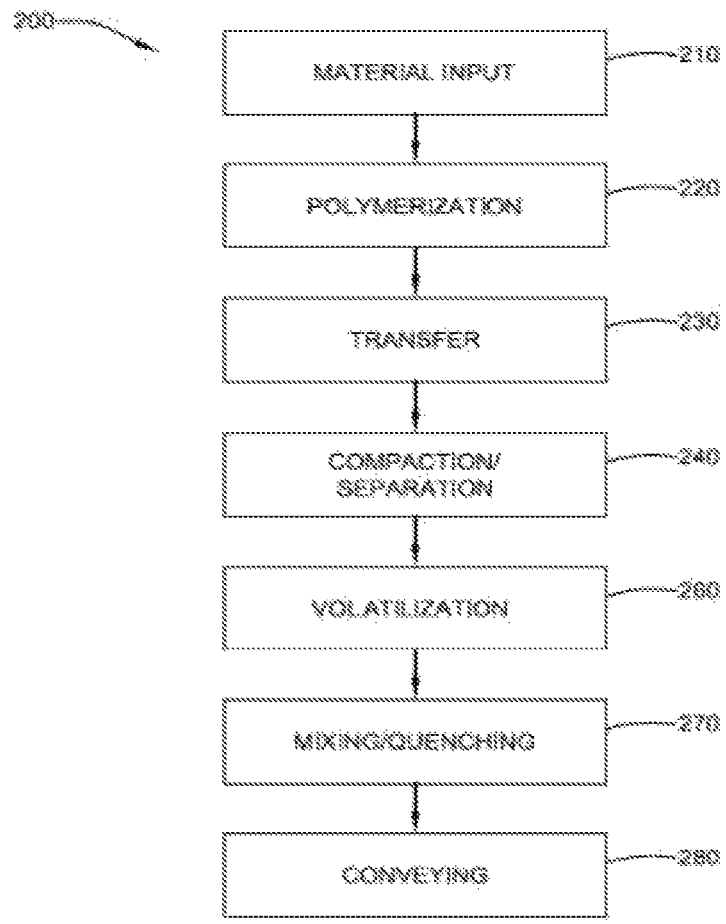
FIG. 4 is a flow diagram of a polymerization process employing a polymer synthesis system according to embodiments of the present invention.

The present invention also provides processes for the production of polymer, where the processes employ the polymer synthesis systems described above. One or more of these processes can be described with reference to FIG. 4, which shows polymer production process 200 including a first step where reactants (e.g., monomer), catalysts, and optionally solvents or diluents are charged to a polymerization reactor in a materials input step 210. These various materials can be charged to the reactor using conventional feed equipment. Once inside the reactor, the reactants are mixed and/or kneaded while undergoing reaction (e.g., polymerization) within a polymerization step 220 to form a polymerization mixture that includes polymer product. Heat generated by the reaction can be removed from the reactor by employing several techniques including evaporative cooling or heat transfer through the surfaces of the reactor. Alternatively, the reaction can proceed adiabatically, especially where the reactants are cooled prior to charging to the reactor. The polymerization mixture is ultimately conveyed (i.e., transferred) out of the polymerization reactor and charged to a deliquifying-quench extruder by way of a transfer step 230. Within the deliquifying-quench extruder, the polymerization mixture is subjected to a series of sequential steps that serve to ultimately provide a stable polymer product that is isolated from the other constituents of the polymerization mixture. In a first sub-step, which is referred to as a compacting and separation step 240, the polymerization mixture is subjected to compaction forces that force diluent and optionally monomer that is entrained within the polymer product to separate from the polymer product. In other words, the polymer product is squeezed, and these squeezing forces cause the physical separation of the diluent (and optionally monomer) from the solid polymer product. Within step 240, bidirectional flow allows for the distancing of the polymer product away from the diluent (and optionally monomer) that was separated via compaction. In other words, through bidirectional flow, polymer product is conveyed in one direction while allowing the diluent (and optionally monomer) to flow in an opposite direction. This bidirectional flow of physically-distinct materials allows for the separation of solid polymer product and the liquid diluent (and optionally monomer). Further separation of the liquid diluent (and optionally monomer) from the polymer product takes place within a subsequent evaporation step 260 wherein the polymer product, as well as any diluent and/or monomer entrained within the polymer product, are subjected to a rapid decrease in pressure (e.g., by way of applying a vacuum to a portion of the extruder). Where this decrease in pressure is enhanced through a vacuum, vaporization of the volatile materials allows for the removal of diluent (and optionally monomer) from the polymer product. Following the volatilization step 260, the polymer product is subjected to intense shear and mixing while a quenching agent is introduced to the polymer product within a quenching step 270. Following quenching step 270, the polymer product is convened out of the deliquifying-quench extruder within a conveying step 280. Once discharged from the extruder, the polymer product can be further subjected to downstream finishing and/or modification steps.

Specific Embodiments

Paragraph A: A polymer synthesis system comprising: a polymerization reactor having an inlet proximate to a first end and an outlet proximate to an opposed second end, said reactor including a rotatable shaft positioned axially within said reactor and including at least two shearing paddles extending radially outward from said rotatable shaft; and a deliquifying-quench extruder having an inlet proximate to a first end and an outlet proximate to an opposed second end, said extruder including a shaft assembly positioned axially within said extruder and including multiple helical flight configurations, said extruder including multiple processing zones defined by the multiple flight configurations, said processing zones including an extraction-compaction zone, a sealing zone downstream of the extraction-compaction zone, a vent-cooling zone downstream of the sealing zone, a quenching zone downstream of the vent-cooling zone, and a conveying zone downstream of the quenching zone, where the deliquifying-quench extruder is downstream of said polymerization reactor, and where said deliquifying-quench extruder is in fluid communication with said polymerization reactor via the outlet of the reactor and the inlet of the extruder.

Paragraph B: The system of Paragraph A, where said reactor includes a sidewall, and further includes hooks extending radially inward toward said shaft.

Paragraph C: The system of any one of or any combination of Paragraphs A-B, where said shaft assembly with the extraction-compaction zone provides a channel having a channel depth, and where the channel depth decreases from a first end to a second end of said shaft assembly.

Paragraph D: The system of any one of or any combination of Paragraphs A-C, where said shaft assembly within the sealing zone includes a dam, and where said shaft assembly within the sealing zone further includes a helical flight downstream of said dam, wherein said helical flight is reversed.

Paragraph E: The system of any one of or any combination of Paragraphs A-D, where the system of any of the preceding claims, where said shaft assembly within the vent-cooling zone is configured to provide for greater conveying capacity relative to the zone immediately upstream of said vent-cooling zone.

Paragraph F: The system of any one of or any combination of Paragraphs A-E, where said shaft assembly within the quenching zone is configured to vigorously mix the contents thereof.

Paragraph G: The system of any one of or any combination of Paragraphs A-F, where said shaft assembly within the conveying zone is configured to convey the contents thereof out of the extruder.

Paragraph H: The system of any one of or any combination of Paragraphs A-G, where said deliquifying-quench extruder is positioned at angle relative to extruder to thereby promote flow of liquid materials toward the inlet of the deliquifying-quench extruder.

Paragraph I: The system of any one of or any combination of Paragraphs A-H, where said rotatable shaft of said polymerization reactor is driven by a first drive source, and where said shaft assembly of said deliquifying-quench extruder is driven by a second drive source.

Paragraph J: The system of any one of or any combination of Paragraphs A-I, where said deliquifying-quench extruder includes one or more inlets for the introduction of liquids into said quenching zone.

Paragraph K: A polymer synthesis system comprising: a first vessel adapted to knead and/or granulate the contents thereof; and a second vessel adapted to process the contents thereof by sequentially (i) compacting the contents thereof while allowing for the bidirectional flow of physically-distinct constituents; (ii) subjecting the contents thereof to reduced pressures and/or increased temperatures to thereby volatilize lower-boiling constituents within the second vessel and separate them from the other constituents; (iii) mixing the contents thereof while introducing a quenching agent; (iv) conveying the contents thereof out of the second vessel, where the first vessel is in fluid communication with the second vessel, and where the second vessel is downstream of the first vessel.

Paragraph L: The system of Paragraph K, where said first vessel is adapted to transfer the contents thereof to said second vessel by way of pulsatile flow.

Paragraph M: The system of any one of or any combination of Paragraphs K-L, where said second vessel is an extruder including a shaft assembly that includes a compacting segment that includes a core shaft and a screw segment, with the screw segment providing a channel having a channel depth, where the channel depth decreases from a first end of the compacting segment to a second end of the compacting segment to thereby provide for compacting the contents thereof.

Paragraph N: The system of any one of or any combination of Paragraphs K-M, where said second vessel is an extruder including a shaft assembly that includes a compacting segment that includes a core shaft and a screw segment, where the screw segment includes with the screw segment providing a flight clearance that allows for the bidirectional flow of physically-distinct constituents.

Paragraph O: The system of any one of or any combination of Paragraphs K-N, where said second vessel is an extruder including a shaft assembly that includes a dam and a screw segments downstream of the dam, where a screw segment downstream of the dam is adapted to provide higher conveying capacity than a screw segment upstream of the dam to thereby create a head space downstream of the dam and provide for reduced pressure to thereby volatilize lower-boiling constituents within the second vessel and separate them from the other constituents.

Paragraph P: The system of any one of or any combination of Paragraphs K-O, where a screw segment immediately downstream of the dam has reverse flights.

Paragraph Q: The system of any one of or any combination of Paragraphs K-P, where said second vessel is an extruder including a shaft assembly, where the shaft assembly includes a high-shear segment adapted to provide high mixing shear the contents of the extruder while introducing a quenching agent.

Paragraph R: The system of any one of or any combination of Paragraphs K-Q, where said second vessel is an extruder including a shaft assembly, where the shaft assembly includes a conveying screw adapted to provide for the conveying of contents within the extruder to an outlet of the extruder.

Paragraph S: A process for the production of polymer, the process comprising the steps of: charging monomer, catalyst and diluent to a polymerization reactor; polymerizing the monomer in the presence of catalyst to form a polymer product within the polymerization reactor while subjecting the monomer, polymer product, and diluent to kneading and/or granulating to thereby form a polymerization mixture; transferring the polymerization mixture from the polymerization reactor to a deliquifying-quench extruder; processing the polymerization mixture within the deliquifying-quench extruder by subjecting the polymerization mixture, or a portion thereof, to a sequential series of steps including (a) compacting the polymerization mixture to force diluent entrained within the polymer product to separate from the polymer product while permitting bidirectional flow whereby the polymer product is conveyed in one direction while the diluent is allowed to flow in an opposite direction, (b) subjecting the polymer product to reduced pressures to thereby volatilize at least a portion of any diluent or monomer entrained within the polymer product, (c) introducing a quenching agent to the polymer product while subjecting the polymer product to shear and mixing, (d) conveying the polymer product out of the deliquifying-quench extruder.

Paragraph T: The process of Paragraph S, where further comprising the step of removing heat generated by said step of polymerizing from the polymerization reactor.

Various modifications and alterations that do not depart from the scope and spirit of this invention will become apparent to those skilled in the art. This invention is not to be duly limited to the illustrative embodiments set forth herein.

What is claimed is:

1. A polymer synthesis system comprising:
   (i) polymerization reactor having an inlet proximate to a first end and an outlet proximate to an opposed second end, said reactor including a rotatable shaft positioned axially within said reactor and including at least two shearing paddles extending radially outward from said rotatable shaft; and
   (ii) a deliquifying-quench extruder having an inlet proximate to a first end and an outlet proximate to an opposed second end, said extruder including a shaft assembly positioned axially within said extruder and including multiple helical flight configurations, said extruder including multiple processing zones defined by the multiple flight configurations, said processing zones including an extraction-compaction zone, a sealing zone downstream of the extraction-compaction zone, a vent-cooling zone downstream of the sealing zone, a quenching zone downstream of the vent-cooling zone, and a conveying zone downstream of the quenching zone, where the deliquifying-quench extruder is downstream of said polymerization reactor, and where said deliquifying-quench extruder is in fluid communication with said polymerization reactor via the outlet of the reactor and the inlet of the extruder.

2. The system as claimed in claim 1, where said reactor includes a sidewall, and further includes hooks extending radially inward toward said shaft.

3. The system as claimed in claim 1, where said shaft assembly with the extraction-compaction zone provides a channel having a channel depth, and where the channel depth decreases from a first end to a second end of said shaft assembly.

4. The system as claimed in claim 1, where said shaft assembly within the sealing zone includes a dam, and where said shaft assembly within the sealing zone further includes a helical flight downstream of said dam, wherein said helical flight is reversed.

5. The system as claimed in claim 1, where said shaft assembly within the vent-cooling zone is configured to provide for greater conveying capacity relative to the zone immediately upstream of said vent-cooling zone.

6. The system as claimed in claim 1, where said shaft assembly within the quenching zone is configured to vigorously mix the contents thereof.

7. The system as claimed in claim 1, where said shaft assembly within the conveying zone is configured to convey the contents thereof out of the extruder.

8. The system as claimed in claim 1, where said deliquifying-quench extruder is positioned at angle relative to horizontal to thereby promote flow of liquid materials toward the inlet of the deliquifying-quench extruder.

9. The system as claimed in claim 1, where said rotatable shaft of said polymerization reactor is driven by a first drive source, and where said shaft assembly of said deliquifying-quench extruder is driven by a second drive source.

10. The system as claimed in claim 1, where said deliquifying-quench extruder includes one or more inlets for the introduction of liquids into said quenching zone.

11. A polymer synthesis system comprising:
   (i) a first vessel adapted to knead and/or granulate the contents thereof; and
   (ii) a second vessel adapted to process the contents thereof by sequentially (i) compacting the contents thereof while allowing for the bidirectional flow of physically-distinct constituents; (ii) subjecting the contents thereof to reduced pressures and/or increased temperatures to thereby volatilize lower-boiling constituents within the second vessel and separate them from the other constituents; (iii) mixing the contents thereof while introducing a quenching agent; (iv) conveying the contents thereof out of the second vessel, where the first vessel is in fluid communication with the second vessel, and where the second vessel is downstream of the first vessel.

12. The system as claimed in claim 11, where said first vessel is adapted to transfer the contents thereof to said second vessel by way of pulsatile flow.

13. The system as claimed in claim 11, where said second vessel is an extruder including a shaft assembly that includes a compacting segment that includes a core shaft and a screw segment, with the screw segment providing a channel having a channel depth, where the channel depth decreases from a first end of the compacting segment to a second end of the compacting segment to thereby provide for compacting the contents thereof.

14. The system as claimed in claim 11, where said second vessel is an extruder including a shaft assembly that includes a compacting segment that includes a core shaft and a screw segment, where the screw segment includes with the screw segment providing a flight clearance that allows for the bidirectional flow of physically-distinct constituents.

15. The system as claimed in claim 11, where said second vessel is an extruder including a shaft assembly that includes a dam and a screw segment downstream of the dam, where a screw segment downstream of the dam is adapted to provide higher conveying capacity than a screw segment upstream of the dam to thereby create a head space downstream of the dam and provide for reduced pressure to thereby volatilize lower-boiling constituents within the second vessel and separate them from the other constituents.

16. The system as claimed in claim 15, where a screw segment immediately downstream of the dam has reverse flights.

17. The system of claim 11, where said second vessel is an extruder including a shaft assembly, where the shaft assembly includes a high-shear segment adapted to provide high mixing shear to the contents of the extruder while introducing a quenching agent.

18. The system of claim 11, where said second vessel is an extruder including a shaft assembly, where the shaft assembly includes a conveying screw adapted to provide for the conveying of contents within the extruder to an outlet of the extruder.

19. A process for the production of polymer, the process comprising the steps of:
 (i) charging monomer, catalyst and diluent to a polymerization reactor;
 (ii) polymerizing the monomer in the presence of catalyst to form a polymer product within the polymerization reactor while subjecting the monomer, polymer product, and diluent to kneading and/or granulating to thereby form a polymerization mixture;
 (iii) transferring the polymerization mixture from the polymerization reactor to a deliquifying-quench extruder; and
 (iv) processing the polymerization mixture within the deliquifying-quench extruder by subjecting the polymerization mixture, or a portion thereof, to a sequential series of steps including (a) compacting the polymerization mixture to force diluent entrained within the polymer product to separate from the polymer product while permitting bidirectional flow whereby the polymer product is conveyed in one direction while the diluent is allowed to flow in an opposite direction, (b) subjecting the polymer product to reduced pressures to thereby volatilize at least a portion of any diluent or monomer entrained within the polymer product, (c) introducing a quenching agent to the polymer product while subjecting the polymer product to shear and mixing, (d) conveying the polymer product out of the deliquifying-quench extruder.

20. The process as claimed in claim 19, further comprising the step of removing heat generated by said step of polymerizing from the polymerization reactor.

* * * * *